UNITED STATES PATENT OFFICE.

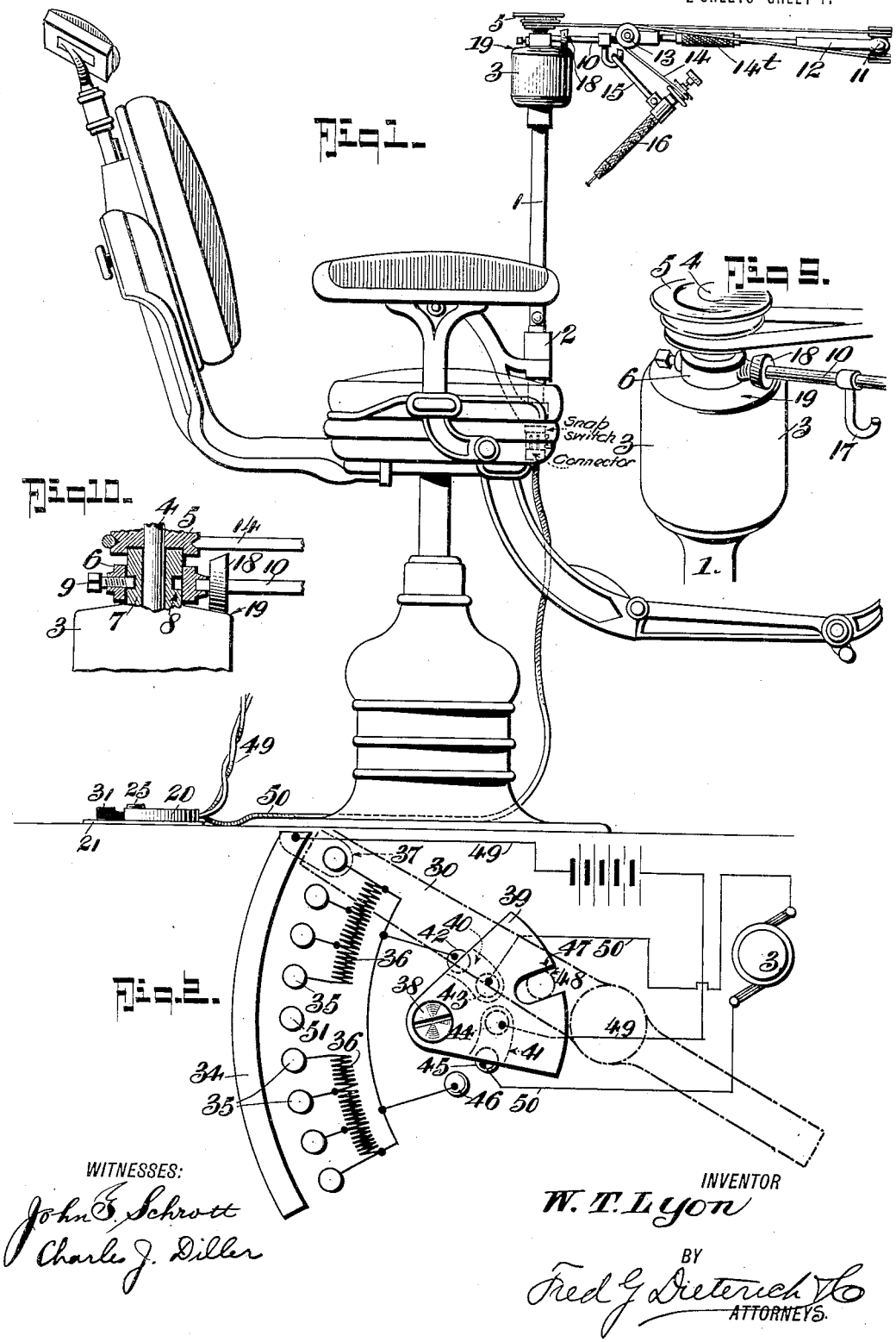

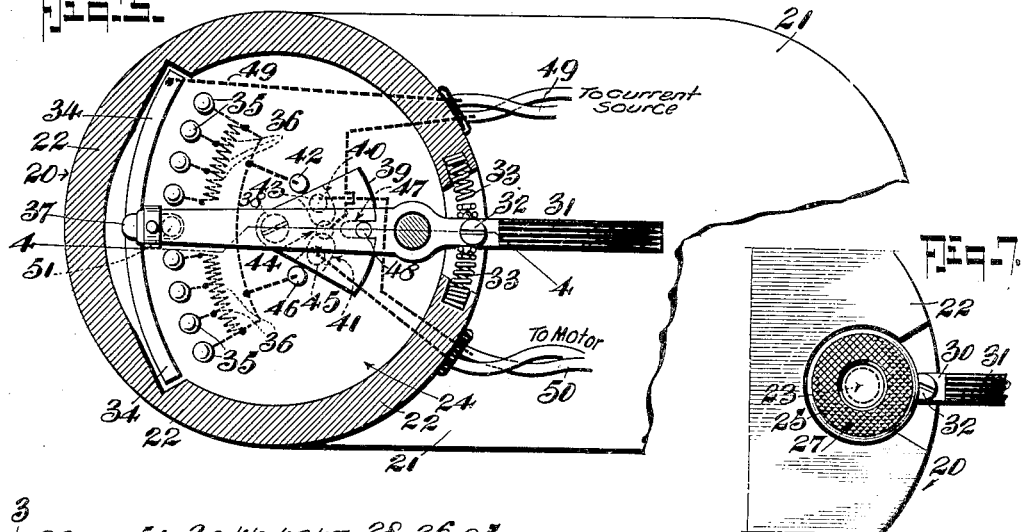
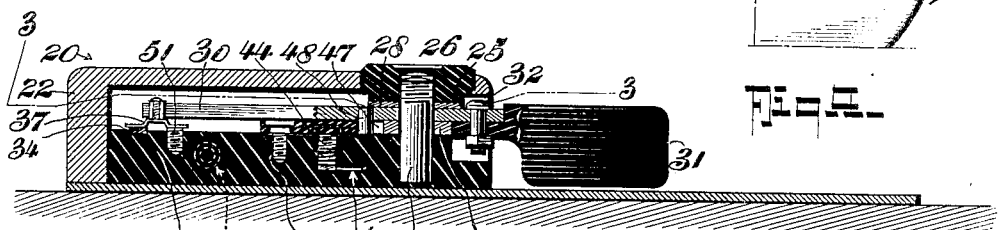
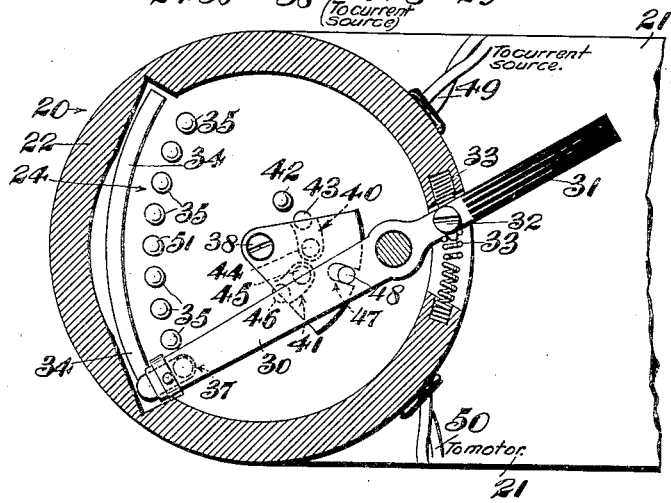
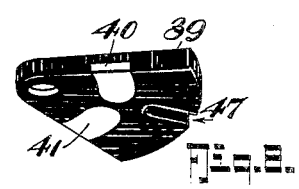
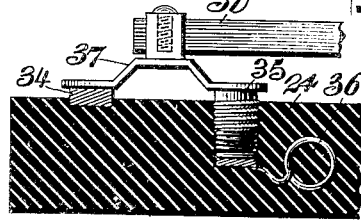

WILLIAM T. LYON, OF PORTLAND, OREGON, ASSIGNOR TO THE INTERNATIONAL DENTAL APPLIANCE CO., OF PORTLAND, OREGON.

RHEOSTAT.

1,204,675.

Specification of Letters Patent.

Patented Nov. 14, 1916.

Application filed September 24, 1914. Serial No. 863,332.

*To all whom it may concern:*

Be it known that I, WILLIAM T. LYON, residing at Portland, in the county of Multnomah and State of Oregon, have invented certain new and useful Improvements in Rheostats, of which the following is a specification.

My invention relates to certain new and useful improvements in current controlling devices, commonly known as rheostats, and the invention primarily has for its object to provide a simple, compact, inexpensive and well constructed device of this character which is especially adapted for use in controlling electric motors employed for driving dental instruments and the like, and in its generic nature the invention comprises a rheostat having an operating lever which continuously tends to assume a neutral position under spring influence and which when moved in one direction will control the motor to effect a turning of the drive shaft of the same in a given direction, and when the lever is moved in the opposite direction the motor will be reversed, and accordingly controlled as to its speed dependent upon the degree to which the lever is moved from its neutral position.

More specifically the invention comprises a supporting base having a series of resistance contacts that are adapted to be successively engaged by the movement of a lever from a mid-position to one side or the other of such mid-position, the base also carrying pole changing contacts which are adapted to be engaged by an auxiliary memmer that is separately pivoted on the base and has a pin and slot connection with the lever whereby as the lever is moved out of its neutral position, the pole changing contact member will be accordingly moved to effect the proper connections with the motor to cause it to turn in a definite direction, dependent upon whether or not the lever is moved to one side or the other.

The invention also includes certain improvements in the arrangement of the driving motor and the operative connections between the motor and the dental instrument.

In its more subordinate nature, the invention also includes those novel details of construction, combination and arrangement of parts, all of which will be fully described, then be specifically pointed out in the appended claims and illustrated in the accompanying drawings, in which:—

Figure 1 is a side elevation illustrating my invention in use. Fig. 2 is a diagrammatic view showing the circuit connections for the controller. Fig. 3 is a horizontal section on the line 3—3 on Fig. 4. Fig. 4 is a vertical section on the line 4—4 of Fig. 3, the parts being in the neutral or non-operative position. Fig. 5 is a view similar to Fig. 3, showing the position of the parts when the lever is moved to its limit to one side of its neutral position to cut out all resistance, and operate the motor at full speed in a given direction. Fig. 6 is an enlarged detail cross section of a contact member such as may be carried by the operating lever to bridge the continuous contact with the resistance contact points. Fig. 7 is a detail top plan view showing the clamping nut. Fig. 8 is a detail enlarged perspective view of the pole changing segment. Fig. 9 is an enlarged detail perspective view of the motor showing the swivel connection with the dental instrument supporting arm. Fig. 10 is a detail cross section of the same.

In the drawings in which like letters and numerals of reference indicate like parts in all of the figures, 1 represents the motor support which is secured to the dental chair by a suitable clamp or bracket 2, and 3 designates the motor which is preferably of the inclosed type and is mounted on the top of the support 1.

The motor 3 has its shaft 4 provided with a driving pulley 5 and the motor casing is provided with a neck 7 having an annular groove 8 to receive the set screw 9 which holds the swivel collar 6 in place, the swivel collar 6 carrying the sweep arm 10 that is provided with a swivel joint 11 and with an extension portion 12 of the sweep arm, the swivel joint 11 including idler pulleys over which the endless driving belt 14 passes, the belt 14 also passing over idler pulleys 13 on the swivel joint between the arm 12 and the bracket 15 which carries the hand piece 16.

17 is a support on which the hand piece may be placed when not in use and 18 is an idler pulley which rides on the surface 19 of the motor housing to assist in supporting the parts.

20 designates the controller or rheostat which forms the essential part of the present invention. The controller 20 comprises a base plate 21 and a cover 22. Deposited within the cover 22 is a block of insulation 24 in which resistance coils 36 are embedded. On a pivot 23 securely fastened in the block 24 by any approved means is a lever 30, a pair of washers 28—29, and a clamp nut 25, the lever 30 being interposed between the washers 28—29 for a purpose presently understood. The clamp nut 25 has a milled face 27 whereby when the foot of the operator is placed on the nut, the nut may be turned by foot so as to clamp the lever in any position in which it may be placed, thus serving as a releasable means for holding the lever in any of its positions. When the member 25 is turned to secure it onto the pin 23 by the operator putting his foot on the member 25 and turning it, the lever is clamped tight, but when the member 25 is turned in the reverse direction to unscrew it from the pin 23, the lever is released. The lever 30 projects through the opening in the cover 22 and carries the insulated handle 31 to which it is secured by a bolt 32 or secured in any other suitable way.

33 designates suitable springs for keeping the lever 30 balanced in a mid or neutral position. Any approved construction of spring device may be employed for this purpose.

34 is a contact strip to which one of the leading-in wires 49 is electrically connected and 35 designates the series of resistance contact points which are electrically connected with the resistance coils 36 as best shown in Figs. 2 and 3.

37 is a bridging contact carried by the lever 30 for bridging the connection between the plate 34 and the contacts 35.

Pivoted on a suitable pivot 38, which is secured to the base 24, is a segment 39 which has a pair of contact plates 40—41 respectively to bridge the contacts 43 to 46 inclusive. The segment 39 has a slot 47 to receive the pin 48 that is carried by the lever 30 whereby to make a pin and slot connection between the lever and the segment.

49 designates the leading-in wires from the current source, one of which is connected to the plate 34, and the other is connected to the pole changing contact 44.

50 designates the armature wires to the motor 3, one of which is connected to the contact 43 while the other is connected to the contact 45, the contacts 42—46 being electrically connected together and to the contacts 35, as shown in Figs. 2 and 3.

When the parts are in the position shown in Fig. 3, no current will flow to the motor as the contact 51 is a "dead" contact and there is no circuit connection between the contacts 42—46, 43 or 45.

The operator upon engaging the handle 31 with his heel or toe and moving it laterally, causes the bridging contact 37 to engage one or another of the resistance contacts 35 and plate 34 and simultaneously causes the contact plates 40—41 to engage the proper pair of pole changing contacts to direct the current through the motor in the proper way.

Assume the parts to have been moved to the position shown in Fig. 5, for example, the resistance will be cut out and the full potential delivered to the motor, the current flowing into contact plate 34, across contact 37 to the lowermost contact 35 in Fig. 5, and from thence to contact 46, across plate 41 to contact 45 and from thence through the motor armature, returning via contact 43, across plate 40 to contact 44 and from thence back to the source of current supply. If the position of the lever be reversed in Fig. 5, the current flow through the motor will also be reversed with the result that the motor will turn in the opposite direction. The speed under which the motor operates is determined by the amount of resistance cut in, as will be clearly understood by those skilled in the art.

While I have designated the resistance coils 36 as located in the base 24, it is obvious they may be elsewhere located, if desired, without departing from the spirit of the invention or the scope of the appended claims.

The rheostat may be readily disconnected from the motor, since a connection is provided at the ends of the wires 50, as indicated in Fig. 1, a switch for cutting the current to the motor "off" and "on" is also provided.

The provision of a tightener 14$^t$ for the endless belt 14 and the placing of the motor 3 on a wall bracket instead of on the standard 1, are mere features of convenience and may be provided for at will.

From the foregoing description, taken in connection with the accompanying drawings, it is thought the complete construction, operation and advantages of my invention will be readily understood by those skilled in the art to which it relates.

What I claim is:

1. In a motor controller, a base, a set of resistance contacts, a set of pole changing contacts, a lever coöperating with said resistance contacts, a pivoted segment coöperative with said pole changing contacts, a pin and slot connection between said pivoted segment and said lever to coöperatively connect the same, means for applying balanced pressures to said lever to continuously tend to hold it in a neutral position, and a foot operable clamping device for securing said lever in any of its positions.

2. In a motor controller, a base, a set of resistance contacts, a set of pole changing contacts, a lever coöperating with said resistance contacts, a pivoted segment coöperating with said pole changing contacts, coöperative connections between said lever and said segment whereby the movement of the lever from a neutral position will effect a similar movement of said segment, a pivot pin upon which said lever is fulcrumed, and a device on said pin for clamping said lever in any of its positions.

3. In a motor controller, a base, a set of resistance contacts, a set of pole changing contacts, a lever coöperative with said resistance contacts, a pivoted member coöperative with said pole changing contacts, a pin and slot connection between said pivoted member and said lever to coöperatively connect the same, a pivot pin upon which said lever is fulcrumed, and a device on said pin for clamping said lever in any of its positions.

4. In a motor controller, a base, a set of resistance contacts, a set of pole changing contacts, a lever coöperating with said resistance contacts, a pivoted segment coöperating with said pole changing contacts, coöperative connections between said lever and said segment whereby the movement of the lever from a neutral point will effect a similar movement of said segment, means continuously acting to hold said lever in a neutral position, a pivot pin upon which said lever is fulcrumed, and a device on said pin for clamping said lever in any of its positions.

5. In a motor controller, a base, a set of resistance contacts, a set of pole changing contacts, a lever coöperating with said resistance contacts, a pivoted member coöperative with said pole changing contacts, a pin and slot connection between said pivoted member and said lever to coöperatively connect the same, means continuously acting to hold said lever in a neutral position a pivot pin upon which said lever is fulcrumed, and a device on said pin for clamping said lever in any of its positions.

WILLIAM T. LYON.

Witnesses:
A. T. Lewis,
Arthur H. Lewis.